July 12, 1955 — J. G. SCHABERG — 2,712,757
RATE GYROSCOPE
Filed Dec. 23, 1953 — 2 Sheets-Sheet 1
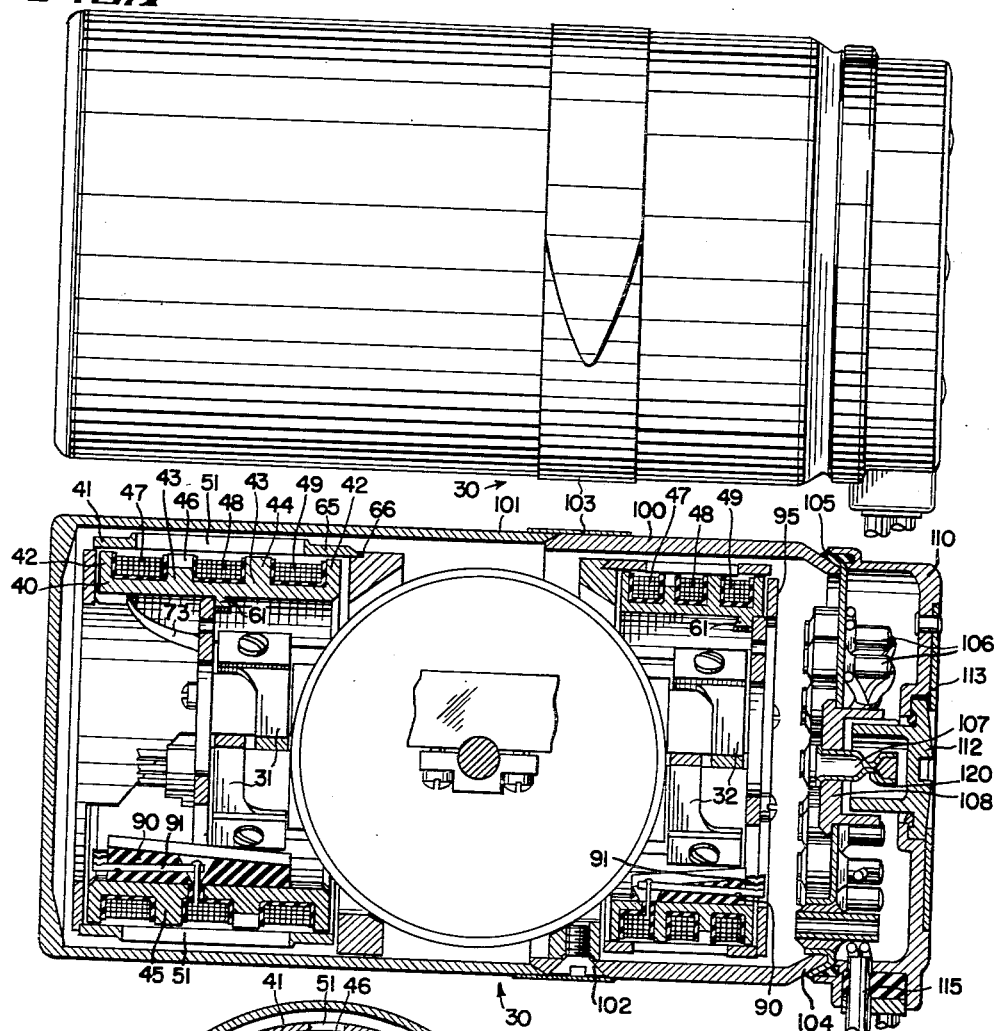
FIG. 1
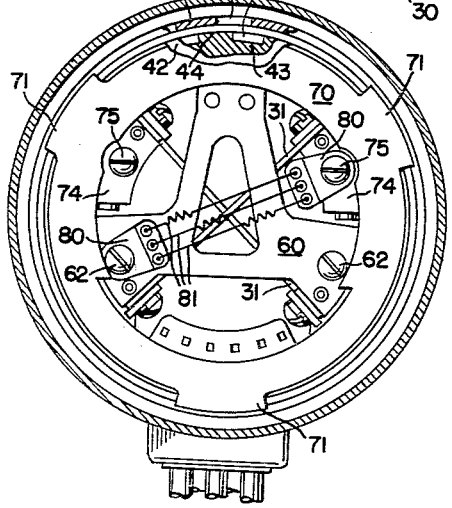
FIG. 2
FIG. 3
INVENTOR.
JOHANNES G. SCHABERG
BY George H Fisher
ATTORNEY

United States Patent Office 2,712,757
Patented July 12, 1955

2,712,757
RATE GYROSCOPE

Johannes G. Schaberg, St. Paul, Minn., assignor to Minneapolis-Honeywell Regulator Company, Minneapolis, Minn., a corporation of Delaware Application December 23, 1953, Serial No. 399,951

12 Claims. (Cl. 74—5.6)

My invention relates to a rate gyroscope design in particular to improvements in rate type gyroscopic instruments.

While rate gyroscopes are well known in the art there has been a continuing attempt to decrease the size and weight of the same while improving on efficiency and sensitivity of the device with the improvement in performance of aircraft which utilize the same. My invention is directed to an improved shape and arrangement of parts of a single degree of freedom type of gyroscope or a rate gyroscope together with an improved signal generating apparatus to provide a small compact gyroscope which is simple in design, economical to manufacture and yet highly sensitive and rugged in construction. It is therefore an object of this invention to provide an improved rate gyroscope design having a simplified arrangement of parts.

It is also an object of this invention to provide in an improved rate gyroscope design an arrangement in which a signal generator and damper are associated with either end of a frame and gimbal for the gyroscope encircling the same to provide a compact arrangement.

It is further an object of my invention to provide an improved compact single degree of freedom gyroscope which may utilize a rate and acceleration output or a damped rate output. These and other objects of my invention will become apparent from a reading of the attached description together with the drawings wherein:

Figure 1 is a plan view of an enclosed rate gyroscope,

Figure 2 is a sectional view of the gyroscope of Figure 1 showing the details and arrangement of parts, Figure 3 is an end elevation view in section of my improved rate gyroscope.

Figure 4:
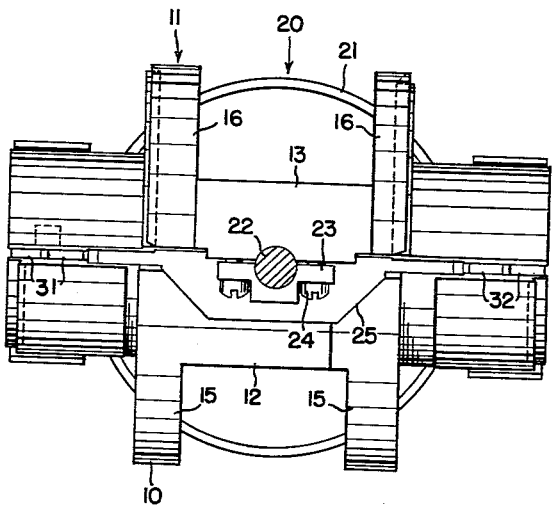
Figure 4 is a side elevation view of the frame and gimbal of the gyroscope with a rotor mounted thereon.

My improved gyroscope obtains its simplicity and compactness through the design, shape and arrangement of its parts. The gyroscope has basically a frame member indicated at 10 and a gimbal 11 which are substantially similar in shape and can best be seen in Figure 4. Both the frame and the gimbal each comprise in outline two elongated members with offset center portions indicated at 12 and 13 respectively which center portions are connected by arcuate or semi-circular connection members 15 and 16 respectively giving each part an outline or form which is spider-like and semi-cylindrical in outline with a hollow central portion and with reduced end portion. The outer periphery of the elongated members are curved and have side surfaces which are machined and beveled for purposes which will be later identified. While the shapes of these gimbal and frame members may vary slightly and may be truly semi-cylindrical in form, that is solid wall, it will be understood that the basic teaching behind this arrangement is that of similarly shaped members which are designed to house a rotor, in a manner to be later identified, and which have end portions or extensions capable of supporting signaling devices and damping devices, to be later identified, such that a cover will enclose the same in a tight or closely fitting arrangement to provide a compact structure.

Figure 5:
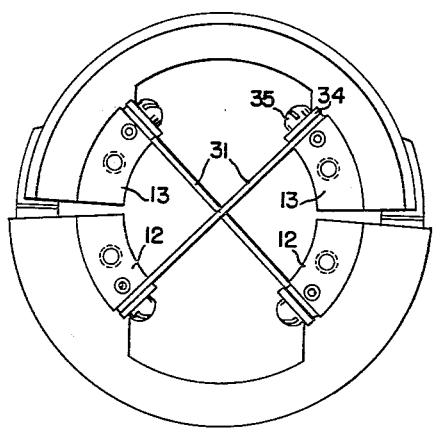
Figure 5 is an end elevation view of the structure of Figure 4.

In Figure 5 it will be seen that the gimbal 11 at center portion 13 carries the rotor for the gyroscope the details of which are not shown but merely indicated schematically at 20 as being encased in a can 21 and having a supporting shaft 22 extending therefrom which shaft is attached to the gimbal at the central portion thereof by means of a bracket 23 which is secured to the gimbal by screws 24. It will be understood that the rotating mass and spinning means or driving motor is located within the can in a conventional manner and that power may be fed to the rotor through a hollow portion of shaft 22 with the rotating mass being supported by suitable bearing means on the shaft. This arrangement is generally conventional and the details are omitted here for simplicity. Frame member 10 has a recessed portion indicated at 25 of its central portion or offset portion so as to clear the bracket by means of which the supporting shaft for the rotor is attached to the gimbal. It will be seen in Figures 4 and 5, that the rotor frame 10 and gimbal 11 are placed in near adjacent relationship such as to define a structure which is substantially cylindrical in outline and with a small gap between the edges of the frame and gimbal. Frame 10 as will be later described is adapted to be attached to a supporting casing of the gyroscope indicated generally at 30 in a manner later to be indentified.

The frame 10 and gimbal 11 are held in this near adjacent position normally by two pairs of leaf springs 31, 32 respectively which are attached between the frame and gimbal at the extremities thereof. Figure 5 is a left end elevation view of the structure of Figure 4 and shows the ends of the elongated members 13 and 12 as having a beveled or mitered edge located approximately 45° from the extent of the shaft 22 supporting the rotor can and structure 20. The leaf springs 31 are attached respectively between the surfaces on the frame and gimbal in a crossed reed fashion and secured thereto by plates and screws indicated at 34 and 35 respectively to secure the reeds to the respective parts. The reeds pass at approximately a 90° relation and thereby set up a pivot axis for the parts to provide relative movement therebetween and at the same time provide the necessary restraint for the rate gyro. It will be seen in Figures 4 and 5 that limited rotation is provided due to the positioning of the parts and the angle of displacement which in the gimbal 11 relative to the frame 10 which in this structure is held stationary will be about an axis defined by the crossed reed pivots which axis is the same as the axis of the cylindrical form or outline set up by the frame and gimbal members which passes through the center of gravity of the rotor and gimbal 20 and normal to the spin axis defined by the shaft 22. The same structure is applied to the opposite end of the gimbal and frame members at the same points with the crossed reeds 32 being connected in the same manner, as will be more evident by the reference to Figure 2.

Referring now to Figure 2 and the left extremity of the same as viewed therein, it will be seen that a signal generator is associated with this end of the frame and gimbal structures. The signal generator is of the type shown, disclosed and claimed in my copending application on a Dynamo Electric Device, Serial No. 390,180, filed November 4, 1953. This signal generator is comprised of a stator 40 and a rotor 41 each of which are annular in form and positioned to surround the ends of the frame and gimbal members 10 and 11. The stator is comprised of an annular rim of magnetic material having three channels therein or grooves defined by a plurality of flanges 42 and 43. The flanges 42 are positioned at the outer periphery and are uniform about the extent of the periphery. The flanges 43 have a plurality of teeth or polar projections such as indicated at 44 along the extent thereof separated by spacings indicated at 46 between the pole teeth or projections. Thus one channel is formed between an end flange 42 and intermediate flange 43, a second channel between the intermediate flanges 43 and the pole teeth thereon and a third channel between the opposite end flange 42 and the adjacent intermediate flange 43. Positioned in these channels are a plurality of windings indicated at 47, 48, and 49. As will be later described, the windings in these channels may be connected and energized in a plurality of different ways, for example the windings 47 and 49 may be connected in series or parallel relation and energized from an alternating current source of power in which case the winding 48 will be the pickup or secondary winding adapted to have an alternating signal induced therein of a reversible phase and variable magnitude. In another arrangement the winding 48 may be the energized winding and being energized from an alternating current source of power with the windings 47 and 49 being connected in a series opposition relation in which the induced output from the two windings will provide a resultant signal which varies in phase and magnitude depending upon the position of the gimbal from a neutral point. As is explained in my copending application, the pole teeth on the flanges 43 are positioned adjacent the spacings 46 between the pole teeth 45 on the opposite flange to provide the operation described in the copending application. Associated with the stator is the rotor 41 in the form of an annular rim of magnetic material having a plurality of apertures indicated at 51 therein. The apertures are positioned on the rotor rim to provide a plurality of magnetic paths between the pole teeth 45 on the flanges 43 and the remaining portions of the stator and end flanges 42 to provide a plurality of magnetic circuits linking the secondary winding with the exciting winding or windings. The magnetic flux flow through these paths will induce in the secondary winding or windings signals which provide a resultant output in proportion to the position of the paths and hence the position of the rotor relative to the stator, the signal being reversible in phase depending upon the relative positions of the parts.

It should be evident that other types of signal generators may be employed with this gyroscope in keeping with the teaching of our invention in which the component parts of the signal generator encircle the end portions of frame and gimbal to provide a compact arrangement and which are secured to the frame and gimbal in a manner to be described below.

The stator 40 of the signal generator is connected to the frame 10 of the gyroscope such that it is the stationary part of the signal generator. The annular form of the stator is secured to the frame in a manner which will be best disclosed by the Figure 3. Stator 40 is connected to the frame 10 by means of an inverted T-shaped supporting and attaching member 60 which abuts against inner flanges 61 on the inner periphery of the annular stator at the curved extremities of the T-shaped member, the upper part or leg of the T resting against the flange and abutting the inner periphery of the stator at this point and the lower edges of the T-shaped member abutting the similar flanges and surfaces of the stator 40 at points approximately 120° displaced therefrom (not shown). This provides a three point suspension for positioning of the stator with the T-shaped member being firmly positioned against the inner periphery of the stator 40 and the flanges 61 such as by press fitting and with the lower portions of the T-shaped supporting and connecting member being connected to the end surfaces of the frame 10 or extensions 12 being secured thereto by screws 62. Thus it will be seen that the stator 40 encircles the frame and gimbal members or the reduced end portions of the frame and gimbal members bearing against the frame member only and clearing the semi-circular shaped connecting member 16 of gimbal 11 as will be evident in Figure 2.

Rotor 41 similarly encircles the stator 40 and the end portions of the frame and gimbal members 10 and 11 respectively being attached at one extremity through a notched surface or flange indicated at 65 into a grooved portion 66 of the semi-circular connection member 16. At the opposite extremity of the stator, there is positioned on a supporting and connecting member 70, this supporting and connecting member having three abutting flanges 71 thereon positioned substantially 120° apart and bearing against the rim of the rotor at these points as will be evidenced in Figure 2. The supporting and connecting member 70 is press fitted or otherwise attached to the rotor 41 at these points and it further includes a pair of transversely extending portions 73 having flanges 74 at the extremities thereof which are disposed adjacent the end surfaces of the longitudinal members 13 of gimbal 11. These flanges are secured to the end portions of the gimbal members 13 by screws 75 to securely position the rotor to the gimbal for rotation therewith. As will be later seen, this particular shape of the support and connection member is required only when the transverse extent of the stator and rotor of the signal generator is greater than that of the end portions of the frame and gimbal member.

In Figure 3 it will also be seen that attached to a flange of the T-shaped member 60 and a flange of the supporting and connecting member 70 are a pair of brackets 80 carrying flex leads 81 which extend therebetween. The leads are attached between the end portions of the frame 10 and gimbal 11 to supply power between these relatively movable parts of the rotor 20. Further lead connections, not shown, extend along the gimbal 11 and through a hollow portion of shaft 22 to the inside of the can 20 wherein they supply power to the armature of a spin motor in a well known manner. The details of this structure are omitted for simplicity. Similarly connections for the coils 47, 48, and 49 of stator 40 are made through a terminal assembly 90 mounted in an insulating bracket 91 attached to the inner periphery of the stator 40 as can be seen in Figure 2. Lead wires from these terminals are directed along the base of the container (not shown) to an external terminal structure supply to be later defined.

The opposite end of the gimbal and frame extensions carry a second device which is similar in structure and parts to the signal generator already described. This device, however, differs in function in that it may be an electromagnetic damper or an accelerometer. Inasmuch as the stator and rotor structure are similar to that already described and the means for connecting the same to the gimbal and frame are the same as that previously described, these details will be eliminated here for simplicity. It should be noted, however, that in Figure 2 the particular transverse dimensions of the stator and rotor are less than that of the signal generator at the opposite extremity of the gyroscope. For this reason the supporting and connecting flange 70 for the rotor has been modified to remove the transverse extending portions 70 and the structure now identified by the number 95, with the same relationship between the peripheral supporting flanges which are press fitted against the rotor of the device and which connect to the end portions of the gimbal member in the same manner through flange extensions. In the present arrangement this second device may be an electromagnetic damper in which case the coils 47 and 49 will be connected to a source of alternating or D. C. power in either a series or parallel relation and the coil 48 will be similarly connected to a similar source of power. When the device is to be used as an accelerometer, either the outer windings 47 and 49 are energized with the D. C. source of power in which case the center winding 48 is the pickup winding or the center winding is energized with the D. C. source of power and the windings 47 and 49 are serially connected and have induced therein the angular acceleration signal. In addition to the damper or signal generator at this end of the gyroscope there is also included the terminal assembly 90 with the terminals 91 for connecting to the winding of the stator of the device. It will also be evident that damping devices other than the electromagnetic types may be employed at this end of the structure as long as one part may be attached to the gimbal and the other part to the frame such that the device will be operated by the relative movement of the gimbal with respect to the frame.

Encircling the gyroscope is the casing 30 which is shown in Figures 1 and 2 is a two-part structure comprising a can 100 and a second part 101. The cylindrical portion or part 100 has apertures with screws 102 therethrough which secure the frame 10 to the casing. This portion supports the frame and hence the remaining portion of the gyroscope and the part 101 telescopes into the part 100 to form a tight seal and encircle the remaining portion of the gyroscope but offering no support to the same. A band indicated at 103 is suitably attached to the casing at this point to secure the parts of the casing together.

The opposite extremity of the casing part 100 has a bent periphery as at 104 and carries at this portion a supporting wall 105 having a plurality of terminals 106 positioned therein. The supporting wall 105 is sealed to the end of the casing portion 100 through suitable means such as solder, and the terminals 106 are sealed therein. In addition a filling and evacuating tube 107 is inserted in the supporting wall through a suitable mounting structure 108 such that the tube extends through the supporting wall. The lead connections from the terminal assemblies 90 at either extremity of the gyroscope are brought to the terminals (not shown) 106 in a manner not shown. Positioned over the exposed terminals is a second cover assembly 110 which is connected with a dust type seal 111 to the end wall 105 and casing portion 100 to protect the same. Covering the filling stem 107 is a removable screw 112 which is held in position by means of a flexible plate 113 attached to the cover 110. Cover 110 also includes a passageway 115 by means of which lead connections may be brought through the cover in a dust type fitting to the terminals 106 to be connected thereto. The gyroscope therefore is enclosed in a casing which is completely sealed and is designed to be evacuated through the tube 107 and if desired filled with an inert gas after which the tube will be sealed in the manner indicated as at 120. The cover 110 may then be removed and the connections made to the terminals 106 after which the cover may be positioned in place by means of a screw 112 to provide a compact device.

In considering this invention it should be kept in mind that the present disclosure is intended to be illustrative only and the scope of the invention should be determined only by the appended claims.

I claim as my invention:

1. A rate gyroscope comprising, a spider-like frame member semicylindrical in form, a similar shaped gimbal member, said members being positioned in near abutting relationship such that they define a hollow cylindrical form, a rotor and spinning means therefor positioned in said hollow cylindrical form of said members with said rotor being pivoted for rotation on said gimbal member about an axis normal to the longitudinal extent of said frame and gimbal members, a pair of leaf springs connected between said frame member and said gimbal member at each of the extremities thereof, said leaf springs pivoting said gimbal about an axis parallel to the longitudinal extent of said members and relative to said frame member, a signal generator comprising annular rotor and stator elements, means attaching said stator element to said frame member at one extremity thereof to encircle said extremity of said gimbal member and said frame member, means attaching said rotor element to said gimbal member to encircle said stator element and said gimbal and frame members such that the rotor element moves with said gimbal member relative to said stator element and said frame member, an electromagnetic damper having an annular rotor and stator element shaped similarly to said signal generator and positioned at the other extremity of said gimbal and said frame members, the stator of said damper being attached to said frame member and the rotor element of said damper being attached to said gimbal member with both parts encircling said gimbal and frame members, and a cylindrical housing enclosing said gyroscope and mounting said frame member.

2. A rate gyroscope comprising, a spider-like frame member semicylindrical in form, a similar shaped gimbal member, said members being positioned in near abutting relationship such that they define a hollow cylindrical form, a rotor and spinning means therefor positioned in said hollow cylindrical form of said members with said rotor being pivoted for rotation on said gimbal member about an axis normal to the longitudinal extent of said frame and gimbal members, a pair of leaf springs connected between said frame member and said gimbal member at each of the extremities thereof, said leaf springs pivoting said gimbal member about an axis parallel to the longitudinal extent of said members and relative to said frame member, a signal generator comprising annular rotor and stator elements, means attaching said stator element to said frame member at one extremity thereof to encircle said extremity of said gimbal member and said frame member, means attaching said rotor element to said gimbal member to encircle said stator element and said gimbal and frame members such that the rotor element moves with said gimbal member relative to said stator element and said frame member, an electromagnetic damper having an annular rotor and stator elements shaped similarly to said signal generator and positioned at the other extremity of said gimbal and said frame members, the stator element of said damper being attached to said frame member and the rotor element of said damper being attached to said gimbal member with both parts encircling said gimbal and frame members, a cylindrical housing enclosing said gyroscope and mounting said frame member, and means sealing said cylindrical casing.

3. A rate gyroscope comprising, a spider-like frame member semicylindrical in form, a similar shaped gimbal member, said members being positioned in near abutting relationship such that they define a hollow cylindrical form, a rotor and spinning means therefor positioned in said hollow cylindrical form of said members with said rotor being pivoted for rotation on said gimbal member about an axis normal to the longitudinal extent of said frame and gimbal members, a pair of leaf springs connected between said frame member and said gimbal member at each of the extremities thereof, said leaf springs pivoting said gimbal member about an axis parallel to the longitudinal extent of said members and relative to said frame member, a signal generator comprising annular rotor and stator elements, means attaching said stator element to said frame member at one extremity thereof to encircle said extremity of said gimbal member and said frame member, means attaching said rotor element to said gimbal member to encircle said stator element and said gimbal and frame members such that the rotor element moves with said gimbal member relative to said stator element and said frame member, an electromagnetic damper having annular rotor and stator elements shaped similarly to said signal generator and positioned at the other extremity of said gimbal and said frame members, the stator element of said damper being attached to said frame member and the rotor element of said damper being attached to said gimbal member with both parts encircling said gimbal and frame members, a cylindrical housing enclosing said gyroscope and mounting said frame member, a hollow tube and a plurality of terminals projecting through an end wall of said casing, said casing being filled with an inert gas and sealed at said hollow tube, and a second casing enclosing said tube and said terminals and secured to said first casing.

4. A rate gyroscope comprising, a spider-like frame member semicylindrical in form, a similar shaped gimbal member, said members being positioned in near abutting relationship such that they define a hollow cylindrical form, a rotor and spinning means therefor positioned in said hollow cylindrical form of said members with said rotor being pivoted for rotation on said gimbal member about an axis normal to the longitudinal extent of said frame and gimbal members, a pair of leaf springs connected between said frame member and said gimbal member at each of the extremities thereof, said leaf springs pivoting said gimbal member about an axis parallel to the longitudinal extent of said members and relative to said frame member, a pair of dynamoelectric devices each comprising a pair of annular relatively movable parts, one of said parts being attached to said gimbal and the other of said parts being attached to said frame member at each extremity of said frame member and said gimbal, both of said parts encircling said frame and gimbal members with one part encircling the other, and a cylindrical casing enclosing said gyroscope and mounting said frame member.

5. A rate gyroscope comprising, a spider-like frame member semicylindrical in form, a similar shaped gimbal member, said members being positioned in near abutting relationship such that they define a hollow cylindrical form, a rotor and spinning means therefor positioned in said hollow cylindrical form of said members with said rotor being pivoted for rotation on said gimbal member about an axis normal to the longitudinal extent of said frame and gimbal members, a pair of leaf springs connected between said frame member and said gimbal member at each of the extremities thereof, said leaf springs pivoting said gimbal member about an axis parallel to the longitudinal extent of said members and relative to said frame member, a hollow tube and a plurality of terminals projecting through an end wall of said casing, said casing being filled with an inert gas and sealed at said hollow tube, and a second casing enclosing said tube and said terminals and secured to said first casing.

6. A rate gyroscope comprising a frame member and a gimbal member each having substantially the same longitudinal and diametrical dimensions and a hollow central portion, said members being positioned in near abutting relationship such as to define a hollow form, a rotor and spinning means therefor positioned within said hollow form of said frame and gimbal members with the rotor being pivoted for rotation on said gimbal member about an axis normal to the longitudinal extent of said frame and gimbal members, a pair of leaf springs connected between said frame member and said gimbal member at each of the extremities thereof, said leaf springs pivoting said gimbal member about an axis parallel to the longitudinal extent of said members and relative to said frame member, the signal generator comprising an annular rotor and stator element, means attaching said stator element to said frame member at one extremity thereof to encircle said one extremity of said gimbal and said frame member, means attaching said rotor element to said gimbal member to encircle said gimbal and frame member such that said rotor moves relative to said stator with said gimbal member, an electromagnetic damper having rotor and stator elements similar to said signal generator and positioned at the other end of said gimbal and frame members, the stator element being attached to said frame member and the rotor element being attached to said gimbal member and both parts encircling said gimbal and frame members, and a cylindrical casing enclosing said gyroscope and mounting said frame member.

7. A rate gyroscope comprising a frame member and a gimbal member each having substantially the same longitudinal and diametrical dimensions and a hollow central portion, said members being positioned in near abutting relationship such as to define a hollow form, a rotor and spinning means therefor positioned within said hollow form of said frame and gimbal members with the rotor being pivoted for rotation with said gimbal member about an axis normal to the longitudinal extent of said frame and gimbal members, a pair of leaf springs connected between said frame member and said gimbal member at each of the extremities thereof, said leaf springs pivoting said gimbal member about an axis parallel to the longitudinal extent of said members and relative to said frame member, a pair of dynamo electric devices comprising a pair of annular relatively movable parts, one of said parts being attached to said gimbal member and the other of said parts to said frame member at both extremities of said frame member and said gimbal member, both of said parts encircling said members and one part encircling the other, and a cylindrical casing enclosing said gyroscope and mounting said frame member.

8. A rate gyroscope comprising a frame member and a gimbal member each having substantially the same longitudinal and diametrical dimensions and with reduced end portions at the longitudinal extremities thereof, said members being positioned in near abutting relationship such as to define a hollow form, a rotor and spinning means therefor positioned within said hollow form of said frame and gimbal members with the rotor being pivoted for rotation on said gimbal member about an axis normal to the longitudinal extent of said frame and gimbal members, a pair of leaf springs connected between said frame member and said gimbal member at each of the reduced extremities thereof, said leaf springs pivoting said gimbal member about an axis parallel to the longitudinal extent of said members and relative to said frame member, a pair of dynamo electric devices comprising a pair of annular relatively movable parts, one of said parts being attached to said gimbal member and the other of said parts being attached to said frame member at the reduced portions thereof at each extremity of said frame member and said gimbal member, both of said parts encircling the reduced portions of said members and one part encircling the other, and a cylindrical casing enclosing said gyroscope and mounting said frame member.

9. A rate gyroscope comprising, a spider-like frame member semicylindrical in form, a similar shaped gimbal member, said members being positioned in near abutting relationship such that they define a hollow cylindrical form, a rotor and spinning means therefor positioned in said hollow cylindrical form of said members, with said rotor being pivoted for rotation on said gimbal member about an axis normal to the longitudinal extent of said frame and gimbal members, a pair of leaf springs connected between said frame member and said gimbal member at each of the extremities thereof, said leaf springs pivoting said gimbal member about an axis parallel to the longitudinal extent of said members and relative to said frame member, a signal generator comprising annular rotor and stator elements, means attaching said stator element to said frame member at one extremity thereof to encircle said extremity of said gimbal member and said frame member, means attaching said rotor element to said gimbal member to encircle said stator element and said gimbal and frame members such that the rotor element moves with said gimbal member relative to said stator element and said frame member, a damping means positioned at the other extremity of said frame and said gimbal members and attached in part to said gimbal member and in part to said frame member, and a cylindrical casing enclosing said gyroscope and mounting said frame member.

10. A rate gyroscope comprising a frame member and a gimbal member each having substantially the same longitudinal and diametrical dimensions and a hollow central portion, said members being positioned in near abutting relationship such as to define a hollow form, a rotor and spinning means therefor positioned within said hollow form of said frame and gimbal members with the rotor being pivoted for rotation on said gimbal member about an axis normal to the longitudinal extent of said frame and gimbal members, a pair of leaf springs connected between said frame member and said gimbal member at each of the extremities thereof, said leaf springs pivoting said gimbal member about an axis parallel to the longitudinal extent of said members and relative to said frame member, a signal generator comprising an annular rotor and stator element, means attaching said stator element to said frame member at one extremity thereof to encircle said one extremity of said gimbal and said frame member, means attaching said rotor element to said gimbal member to encircle said gimbal and frame member such that said rotor element moves relative to said stator element with said gimbal member, a damping means positioned at the other extremity of said frame and said gimbal members and attached in part to said gimbal member and in part to said frame member, and a cylindrical casing enclosing said gyroscope and mounting said frame member.

11. A rate gyroscope comprising, a spider-like frame member semicylindrical in form, a similar shaped gimbal member, said members being positioned in near abutting relationship such that they define a hollow cylindrical form, a rotor and spinning means therefor positioned in said hollow cylindrical form of said members with said rotor being pivoted for rotation on said gimbal member about an axis normal to the longitudinal extent of said frame and gimbal members, a pair of leaf springs connected between said frame member and said gimbal members at each of the extremities thereof, said leaf springs pivoting said gimbal member about an axis parallel to the longitudinal extent of said members and relative to said frame member, a pair of signal generating means positioned at either extremity of said frame and gimbal members, each of said signal generating means including a pair of annular relatively movable parts, one of said parts being attached to said gimbal member and the others of said parts being attached to said frame member at both extremities of said frame and said gimbal members, both of said parts encircling said members and one part encircling the other, and cylindrical casing means enclosing said gyroscope and mounting said frame member.

12. A rate gyroscope comprising, a spider-like frame member semicylindrical in form, a similar shaped gimbal member, said members being positioned in near abutting relationship such that they define a hollow cylindrical form, a rotor and spinning means therefor positioned in said hollow cylindrical form of said members, with said rotor being pivoted for rotation on said gimbal member about an axis normal to the longitudinal extent of said frame and gimbal members, a pair of leaf springs connected between said frame member and said gimbal member at each of the extremities thereof, said leaf springs pivoting said gimbal member about an axis parallel to the longitudinal extent of said members and relative to said frame member, a pair of signal generating means positioned at either extremity of said frame and gimbal members, each of said signal generating means including a pair of annular relatively movable parts, one of said parts being attached to said gimbal and the other of said parts being attached to said frame member at both extremities of said frame and said gimbal members, both of said parts encircling said members and one part encircling the other, a hollow tube and a plurality of terminals projecting through an end wall of said casing, said casing being filled with an inert gas and sealed at said hollow tube, and a second casing enclosing said tube and said terminals and secured to said first casing.

References Cited in the file of this patent
UNITED STATES PATENTS

| | | |
|---|---|---|
| 2,291,612 | Draper | Aug. 4, 1942 |
| 2,517,612 | Varian | Aug. 8, 1950 |
| 2,581,965 | Miller | Jan. 8, 1952 |
| 2,672,054 | Warren et al. | Mar. 16, 1954 |